United States Patent [19]

Fujita

[11] Patent Number: 5,033,040
[45] Date of Patent: Jul. 16, 1991

[54] OPTICAL INFORMATION RECORDING AND REPRODUCING APPARATUS WITH TRACKING ERROR CONTROL

[75] Inventor: Teruo Fujita, Nagaokakyo, Japan

[73] Assignee: Mitsubishi Denki Kabushiki Kaisha, Tokyo, Japan

[21] Appl. No.: 315,899

[22] PCT Filed: Jun. 21, 1988

[86] PCT No.: PCT/JP88/00614
§ 371 Date: Feb. 17, 1989
§ 102(e) Date: Feb. 17, 1989

[30] Foreign Application Priority Data

Jun. 22, 1987 [JP] Japan .................... 62-153495

[51] Int. Cl.$^5$ .............................. G11B 7/00
[52] U.S. Cl. .................. 369/44.37; 369/44.41; 369/112
[58] Field of Search ............ 369/44.11, 44.32, 44.37, 369/44.41, 44.42, 109, 100, 112

[56] References Cited

U.S. PATENT DOCUMENTS 4,498,159  2/1985  Daimon .................. 369/109 X
4,945,529  7/1990  Ono et al. ................. 369/109

Primary Examiner—Robert L. Richardson
Attorney, Agent, or Firm—Wolf, Greenfield & Sacks

[57] ABSTRACT

An optical information recording/reproducing apparatus which includes a multibeam system optical head extremely reducible of generation of tracking offset caused by the inclination of a disc or track follow-up, so that the twin-spot method and the push-pull method are used to fetch a tracking error signal with respect to one reproducing light beam, the reproducing light beam being tracking-controlled by use of the tracking error signal obtained by the twin-spot method, and then the tracking control for other light beams is performed by use of both the tracking error signal obtained by the push-pull method and the tracking error signal obtained by the push-pull method with respect to the reproducing light beam.

15 Claims, 12 Drawing Sheets

OPTICAL INFORMATION RECORDING AND REPRODUCING APPARATUS WITH TRACKING ERROR CONTROL

FIELD OF THE INVENTION

The present invention relates to an optical information recording/reproducing apparatus for irradiating a reproducing beam and a recording beam onto an information recording medium, and more particularly to an optical information recording/reproducing apparatus improving the tracking performance.

BACKGROUND OF THE INVENTION

FIG. 10 is a structural view of the conventional optical information recording/reproducing apparatus described on Pages 58 through 62—"LD Array Head For DRAW"—of "Micro-Optics News"(Vol. 3, No. 1, edited on Feb. 4, 1985) by Ito and Ohta.

Referring to FIG. 10, reference numeral 1 designates a semiconductor laser array emitting two light beams a recording beam L1 of high intensity of light and reproducing beam L2 of low intensity of light. Reference numeral 2 designates a collimator lens for collimating the parallel light beams L1 and L2 emitted from the semiconductor laser array 1, and 3 designates a beam shaping prism for correcting the distribution of optical strength of the respective collimated beams L1 and L2.

Reference numeral 4 designates a polarizing beam splitter, which is adapted to transmit therethrough the beams L1 and L2 to a beam shaping prism, toward an information recording medium (to be discussed below) and to reflect toward an error detecting system (to be discussed below) a recording reflected beam L1' and a reproducing reflected beam L2' from the information recording medium.

Reference numeral 5 designates a reflecting mirror, and 6 designates a ¼ wavelength plate, which are disposed on an optical path at the transmission side of the polarizing beam splitter 4.

Reference numeral 7 designates an objective lens for focusing onto the beams L1 and L2 on the information recording medium the beams L1 and L2, said beams having already passed the reflecting mirror 5 and ¼ wavelength plate 6 respectively. 8 designates an information recording medium comprising an optical disc rotatable around a rotary shaft 8a, and 9 designates an information track 9 formed concentrically or spirally in the information recording medium 8.

Reference numeral 10 designates a convex lens disposed on an optical path at the reflection side of the polarizing beam splitter 4, and 11 designates a spatial filter disposed at the focal point of convex lens 10, which cuts off the recording reflected beam L1' reflected from the information recording medium 8 and allows only the reproducing reflected beam L2' to transmit through the lens 11.

Reference numeral 12 designates a beam splitter for dividing the reproducing reflected beam L2' which has already passed the spatial filter 11. The beam is directed toward a tracking error detection system and toward a focusing error detection system (both to be discussed below). Reference numeral 13 designates a two-divided photodetector for receiving the reproducing reflected beam L2' which has passed the beam splitter 12. Reference numeral 14 designates a convex lens, 15 designates a knife edge, and 16 designates a two-divided photodetector for receiving the reproducing reflected beam L2' through the knife edge 15. All of the components 14, 15 and 16 are disposed on the optical path at the reflection side of the beam splitter 12.

Reference numeral 17 designates a differential amplifier which takes in a difference between the two signals output from the two-divided photodetector 13. Reference numeral 18 designates a tracking actuator for driving the objective lens 7 in the traversing direction (in the direction of the arrow T) with respect to the information track 9 on the basis of an output signal of the differential amplifier 17. Reference numeral 19 designates a differential amplifier which takes in a difference between the two signals output from the two-divided photodetector 16, and 20 designates a focusing actuator for driving the objective lens 7 in the vertical direction (in the direction of the arrow F) with respect to the surface of the information recording medium 8 on the basis of the output signal of the differential amplifier 19.

In addition, the two-divided photodetector 13 and differential amplifier 17 constitute the tracking error detection system for detecting a tracking error of the reproducing beam L2 irradiated to the information recording medium 8. The convex lens 14, knife edge 15, two-divided photodetector 16 and differential amplifier 19, constitute the focusing error detection system for detecting a focusing error of the reproducing beam L2.

FIG. 11 is an illustration showing the irradiation states of the respective light beams L1 and L2 with respect to the information track 9 in FIG. 10. Reference numerals P1 and P2 designate two light spots, in other words, a recording spot and a reproducing spot, formed of the condensed beams L1 and L2, the arrow D designates the traveling direction by rotation of the information recording medium 8, and 21 designates a pit formed on the information track 9 by the recording spot P1.

Next, explanation will be given on operation of the conventional optical information recording/reproducing apparatus shown in FIGS. 10 and 11.

The recording beam L1 and reproducing beam L2 emitted from the semiconductor laser array 1 are collimated by the collimator lens 2 to the parallel light beams and further formed by the beam shaping prism 3 into two light beams having nearly symmetrical intensity-distribution with respect to the optic axis rotationally.

Nextly, the recording beam L1 and reproducing beam L2 are incident on the objective lens 7 through the polarizing beam splitter 4, reflection mirror 5 and ¼ wavelength plate 6 and focused on the information track 9 at the information recording medium 8 to generate the recording spot P1 and reproducing spot P2.

The recording spot P1 is advanced with respect to the rotation direction of the information recording medium 8 to form on the information track 9 the pits 21 which are modulated according to the contents of information, and the lagging reproducing spot P2 reproducing, at the same time, the content of information included in the recorded pit.

Continuously, the recording reflected beam L1' and reproducing reflected beam L2' reflected from the information recording medium 8 are again incident on the polarizing beam splitter 4 through the objective lens 7, ¼ wavelength plate 6 and reflection mirror 5. The reflected beams L1' and L2', which reciprocate through the ¼ wavelength plate 6 so as to rotate in the polarizing direction of 90°, are reflected at the polarizing beam splitter 4 and image-formed on the spatial filter 11 by the convex lens 10. In this case, only the reproducing reflected beam L2' passes through the spatial filter 11, is divided by the beam splitter 12, and is received by the two-divided photodetectors 13 and 16.

Accordingly, the tracking error signal is detected by the push-pull method using the two-divided photodetector 13, the focusing error signal being detected by the knife-edge method. The tracking error signal and focusing error signal thus obtained are amplified by the differential amplifiers 17 and 19 so as to drive the tracking actuator 18 and focusing actuator 20, respectively.

Also, the sum of output signals (not shown) of two-divided photodetector 13 is gained to detect the quantity of light of reproducing reflected beam L2' so as to reproduce the information signal recorded on the information track 9 at the information recording medium 8.

The conventional optical information recording/reproducing apparatus records and reproduces the information as mentioned above. It is generally known that when the push-pull method detects a tracking error signal, the tracking offset becomes larger.

FIG. 12 is a characteristic graph showing the relation between the follow-up quantity of the objective lens 7 with respect to the information track 9 and the tracking offset quantity, which is described in, for example, "Optical head for write-once disk with two perpendicular axes" of "Optical Memory Symposium" (in 1985, Pages 97 through 102). FIG. 12 shows that, when a track follow-up amount of the objective lens 7 is 100 μm, the tracking offset is generated by only about 0.08 μm. Usually, a tolerance of tracking offset is about 0.05 to 0.1 μm so that it is seen that an offset value of 0.08 μm is about the limit of the tolerance.

FIG. 13 is a characteristic graph showing the relation between the inclination of the information recording medium 8 and the tracking offset quantity, which is described in Pages 224 through 229 of, for example, "On-land Composite Pregroove Method for High Track Density Recording" (by Y. Tsunoda et al), SPIE, Vol. 695, 1986. In this case, it is shown that the information recording medium 8 inclines at an angle of 1° to generate a tracking offset of 0.11 μm to exceed the aforesaid tolerance.

It is well-known that, when a twin-spot method for taking a difference in the quantities of reflected light of the side spots is used instead of the push-pull method, the aforesaid problem of tracking offset is almost solved. The twin-spot method is adopted to most pick-ups for CD (compact disc).

The twin-spot method is described in, for example, "Principles of Optical Discsystems" [(by G. Bouwhuis et al), Adam Hilger Ltd., in 1985, Pages 71 to 72].

However, it is difficult to use the twin-spot method for an apparatus using the two light beams L1 and L2 as shown in FIG. 10.

The reason for the above is that to obtain the side spots for detecting tracking error, when a diffraction grating is disposed between the collimator lens 2 and the beam shaping prism 3 as shown in FIG. 10, six light spots P1 through P6 are created merely within several ten μm on the information track 9 as shown in FIG. 14. In FIG. 14, reference numerals P3 and P4 designate side spots generated from the recording beam L1, P5 and P6 designate side spots generated from the reproducing beam L2, and the distance between the recording spot P1 and the reproducing spot P2 is about 20 to 30 μm.

It is necessary in performing the tracking control of reproducing beam L2 by the twin-spot method to pick up the reflected light only from the side spots P5 and P6. However, as shown in FIG. 14, since intervals between the adjacent light spots P1 through P6 on the information track 9 are very small as about 10 μm, it is extremely difficult to separate the reflected light only of the respective side spots P5 and P6 by use of the spatial filter 11 or the like. Also, there is a great possibility that the recording reflected beam L1' is larger in strength than the reproducing reflected beam L2' and thus, may leak into the reflected lights of side spots P5 and P6, whereby it is more difficult to pick up the reflected light of side spots P5 and P6.

Also, it is difficult for an optical information recording/reproducing apparatus using one light beam for both the recording and reproducing information to adopt the twin-spot method. In this case, for example, during the information recording, the light spots formed on the information recording medium 8 are the recording spot P1 and side spots P3 and P4 (refer to FIG. 14) only, at which time the side spot P3 is positioned on the non-recording information track 9 and the side spot P4 is positioned on the already recorded information track 9.

Accordingly, even in the state where no tracking offset exists in the recording spot P1 during the information recording, the quantities of reflected lights of side spots P3 and P4 are different from each other, whereby the use of the twin-spot method results in the occurrence of tracking offset.

Furthermore, the relative-positional relationship of the recording spot P1 is mechanically adjusted to coincide with the position of the reproducing spot P2. But in the conventional apparatus in FIG. 10, despite that one objective lens 7 focuses the recording beam L1 and reproducing beam L2 on the information recording medium 8, the focusing error signal and tracking error signal are obtained only from the reflected light of the reproducing spot P2. Accordingly, when the information recording medium 8 becomes eccentric to even slightly deteriorate the parallelism between the line connecting two light spots P1 and P2 and the information track 9, the tracking offset is generated at the recording spot P1.

The conventional optical information recording/reproducing apparatus, as above-mentioned, detects the tracking error signal by use of the push-pull method, thereby creating the problem in that the tracking offset generated by the track follow-up of objective lens 7 or the inclination of information recording medium 8 becomes larger and the tracking control cannot be stabilized.

Also, since the focusing error signal and tracking error signal are obtained only from the reflected light of the reproducing spot P2, the parallelism between the line connecting the light spots P1 and P2 and the information track 9, deteriorates thereby making stable tracking control impossible.

SUMMARY OF THE INVENTION

An object of the invention is to provide an optical information recording/reproducing apparatus which can reduce an tracking offset of the light spot caused by a track follow-up of an objective lens or an inclination of an information recording medium and perform stable tracking control.

Another object of the invention is to provide an optical information recording/reproducing apparatus which reduces a tracking offset of the light spot caused by a track follow-up of the objective lens, an inclination of the information recording medium, or eccentricity of the information recording medium, thereby enabling the tracking control to be stably performed.

The optical information recording/reproducing apparatus of the present invention is provided with side spot generating means for forming a pair of side spots with respect to the reproducing spot, beam composing means for composing a recording beam and a reproducing beam, and a tracking error detection system for obtaining a tracking error signal by a twin-spot method on the basis of side reflected beams.

The optical information recording/reproducing apparatus in another of the present invention is provided with side spot generating means, beam composing means, a first tracking error detection system for obtaining a tracking error signal St(R) by the twin-spot method on the basis of the side reflected beams, a second tracking error detection system for obtaining a tracking error signal S′t(R) by the push-pull method on the basis of the reproducing reflected beam, a third tracking error detection system for obtaining a tracking error signal S′t(W) by the push-pull method on the basis of the recording reflected beam, and a fourth tracking error detection system for obtaining a tracking error signal St(W) on the basis of the tracking error signal S′t(W) and of the tracking error signal S′t(R).

In the present invention, the tracking control for the reproducing beam is performed on the basis of the tracking error signal.

In the optical information recording/reproducing apparatus in another embodiment of the present invention, the reproducing beam is tracking-controlled on the basis of the tracking error signal St(R) and the recording beam is done so on the basis of that St(W).

The present invention is provided with the side spot generating means for forming a pair of side spots with respect to the reproducing spot, beam composing means for composing the recording beam and reproducing beam, and tracking error detection system for obtaining the tracking error signal by the twin-spot method on the basis of the side reflected beams, thereby performing the tracking control for the reproducing beam on the basis of the tracking error signal. Hence, the invention is advantageous in that the tracking offset of the light spot caused by the track follow-up or the inclination of the information recording medium is reduced and the tracking control is stably performable.

The optical information recording/reproducing apparatus in another embodiment of the present invention is provided with the side spot generating means, beam composing means, a first tracking error detection system for obtaining the tracking error signal St(R) by the twin-spot method on the basis of side reflected beams, a second tracking error detection system for obtaining the tracking error signal S′t(R) by the push-pull method on the basis of reproducing reflected beam, a third tracking error detection system for obtaining the tracking error signal S′t(W) by the push-pull method on the basis of recording reflected beam, and a fourth tracking error detection system for obtaining the tracking error signal St(W) on the basis of the tracking error signal S′t(W) and of the tracking error signal S′t(R), thereby performing the tracking control of the reproducing beam on the basis of the tracking error signal St(R) and that of the recording beam on the basis of the tracking error signal St(W). Hence, the present invention has the additional advantage of providing the optical information recording/reproducing apparatus which reduces the tracking offset of the light spot caused by eccentricity of the information recording medium and is performable of further stable tracking control.

DESCRIPTION OF THE PREFERRED EMBODIMENTS

Figure 1:
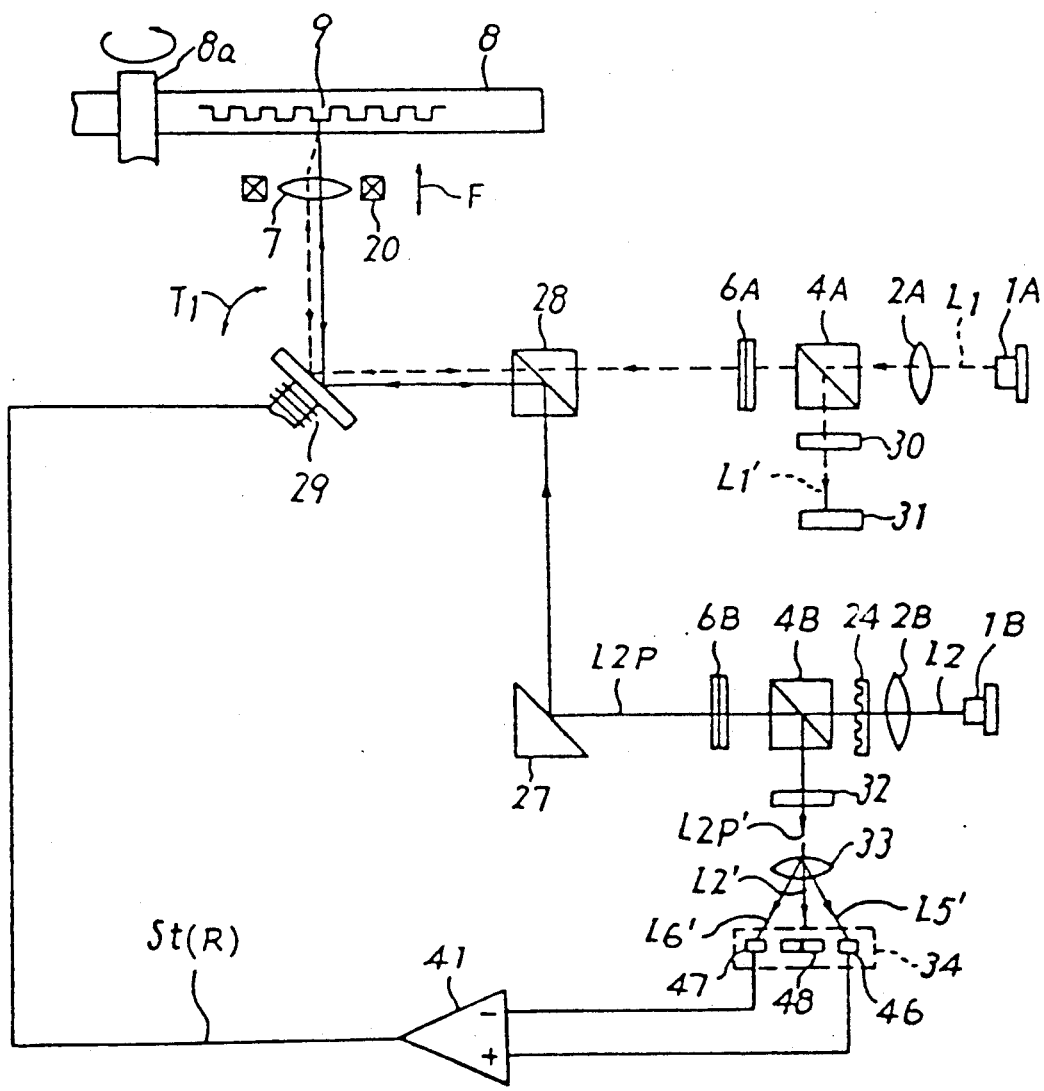
FIG. 1 is a structural view of an embodiment of an information recording/reproducing apparatus of the invention.

FIG. 1 is a structural view of an embodiment of the present invention, reference numeral 7 through 9 and 20 are the same as the above mentioned. And reference numeral 2A and 2B, 4A and 4B, 6A and 6B correspond to the collimator lens 2, the polarizing beam splitter 4, ¼ wavelength plate respectively.

Reference numeral 1A designates a light source comprising a semiconductor laser emitting a recording light beam L1 of wavelength $\lambda_1$, and 1B designates a light source comprising a semiconductor laser emitting a reproducing beam L2 of wavelength $\lambda_2$.

Figure 14:
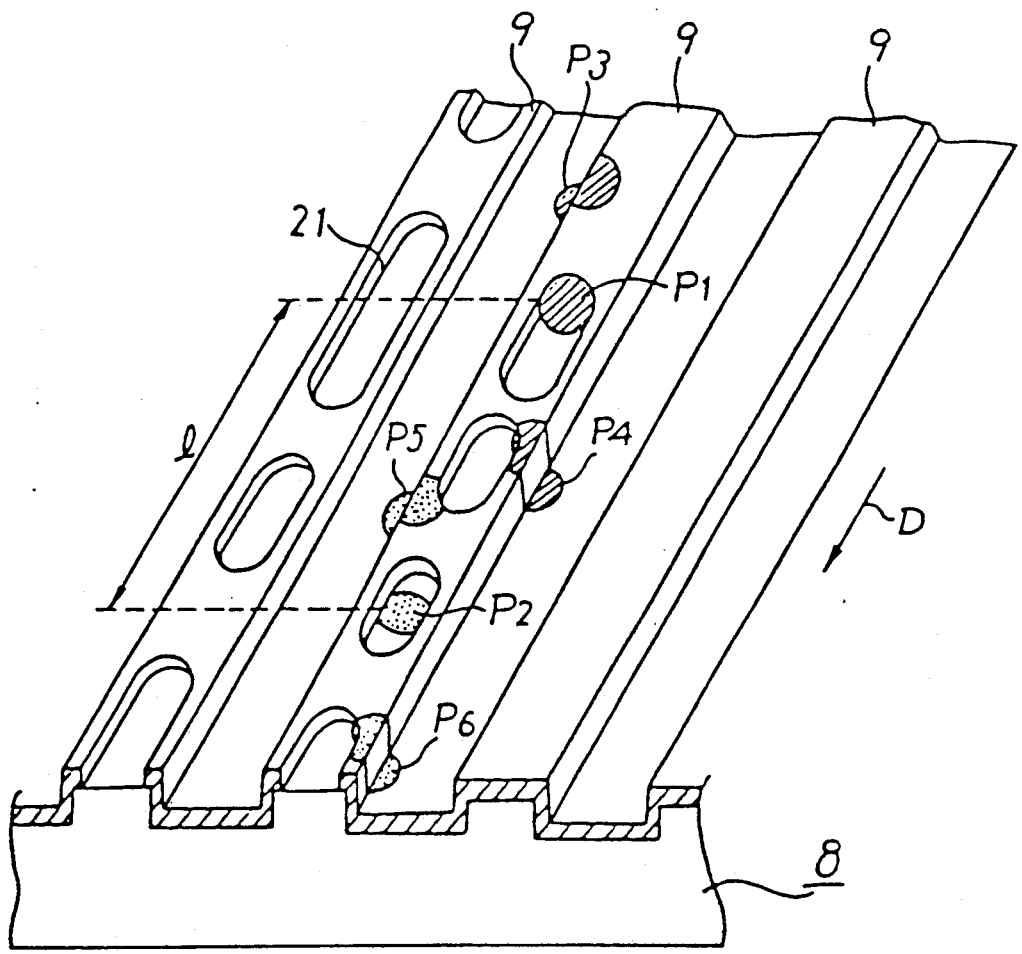
FIG. 14 is a perspective illustration of the irradiation state of the light beams with respect to the information recording medium at another conventional optical information recording/reproducing apparatus.

Reference numeral 24 designates a diffraction grating for generating tracking side beams, which is disposed between the collimator lens 2B and the polarizing beam splitter 4B, adapted to convert the reproducing beam L2 to a reproducing beam L2P including side beams, and constitutes side spot generating means for forming a pair of side spots P5 and P6 (refer to FIG. 14).

Reference numeral 27 designates a reflection mirror disposed on the optical path of the reproducing beam L2P passing the ¼ wavelength plate 6B, and 28 designates a dichroic beam splitter acting as beam composing means which transmits the recording beam L1 of wavelength $\lambda_1$ and reflects the reproducing beam L2P of wavelength $\lambda_2$. The dichroic beam splitter 28 is disposed at the intersection of the recording beam L1 passing the ¼ wavelength plate 6A and reproducing beam L2P reflected by the reflector 27.

Reference numeral 29 designates a tracking mirror disposed on the optical paths of the two light beams L1 and L2P composed by the dichroic beam splitter 28, which projects the light beams L1 and L2P toward the information recording medium 8 and rotates in the direction of the arrow T1 so as to tracking-control the reproducing beam L2P.

Reference numeral 30 designates a wavelength filter for transmitting therethrough only a recording reflected beam L1' of wavelength $\lambda_1$, and 31 designates a photodetector for receiving the recording the recording reflected beam L1' passing the wavelength filter 30.

Reference numeral 32 designates a wavelength filter transmitting therethrough only a reproducing reflected beam L2P' of wavelength $\lambda_2$, and 33 designates a convex lens disposed on the optical path of the reproducing reflected beam L2P' passing through the wavelength filter 32.

Reference numeral 34 designates a four-divided photodetector for receiving the reproducing reflected beam L2' and side reflected beam L5' and L6' divided by the convex lens 33, which is adapted to receive the reproducing reflected beam L2' at a pair of central receiving surfaces 48 and the side reflected beams L5' and L6' at both end receiving surfaces 46 and 47.

Reference numeral 41 designates a differential amplifier fetching a difference between the signals from the light receiving surfaces 46 and 47 so as to output a tracking error signal St(R) by the twin-spot method, the tracking error signal St(R) drivingly controlling the tracking mirror 29 as the tracking actuator for the reproducing beam L2(L2P). Accordingly, the differential amplifier 41 and tracking mirror 29 constitute a tracking control system with respect to the reproducing beam L2(L2P).

The wavelength filter 32, convex lens 33, four-divided photodetector 34 and differential amplifier 41, constitute a tracking error detection system for the reproducing beam L2(L2P) by the twin-spot method.

Figure 10:
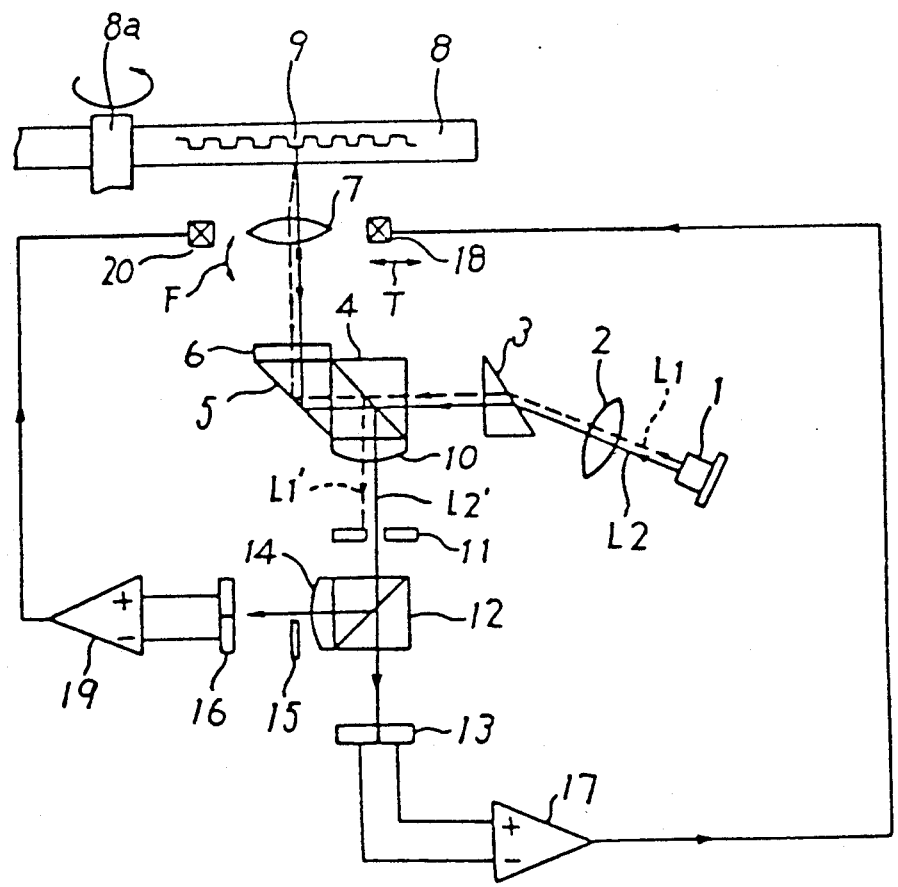
FIG. 10 is a structural view of the conventional optical information recording/reproducing apparatus.
Figure 11:
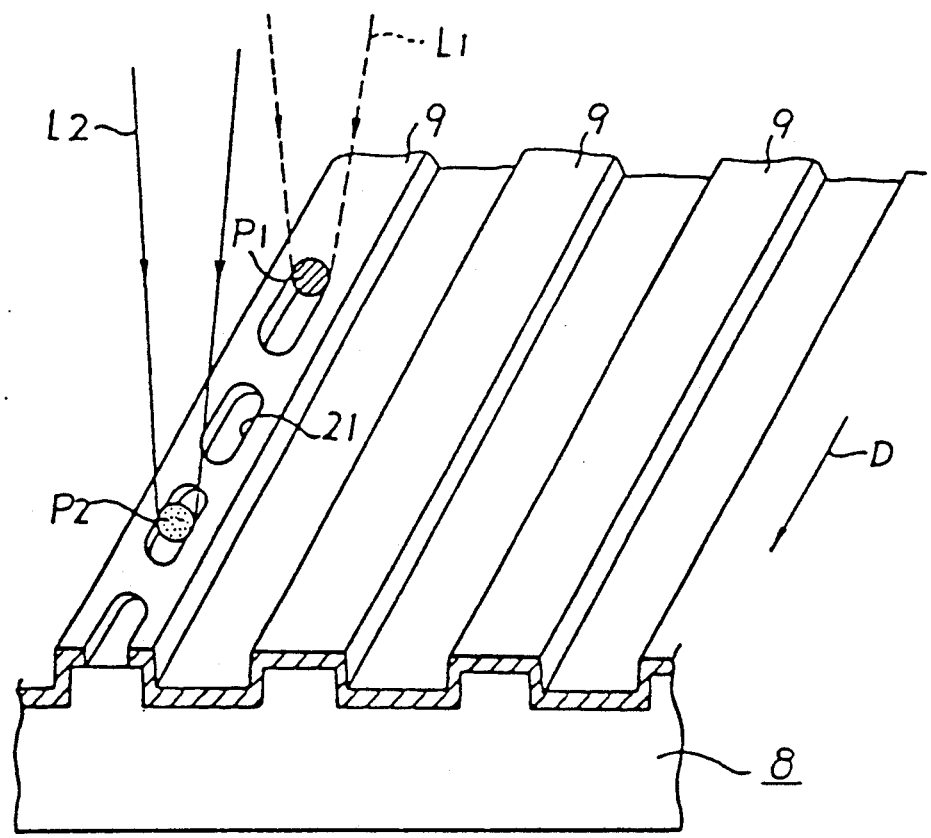
FIG. 11 is a perspective illustration of the irradiation state of the light beam with respect to the information recording medium in FIG. 10.

In addition, a focusing error detection system, which can be relied on the well-known knife edge method (refer to FIG. 10) or the astigmatic method, is not shown.

Figure 2:
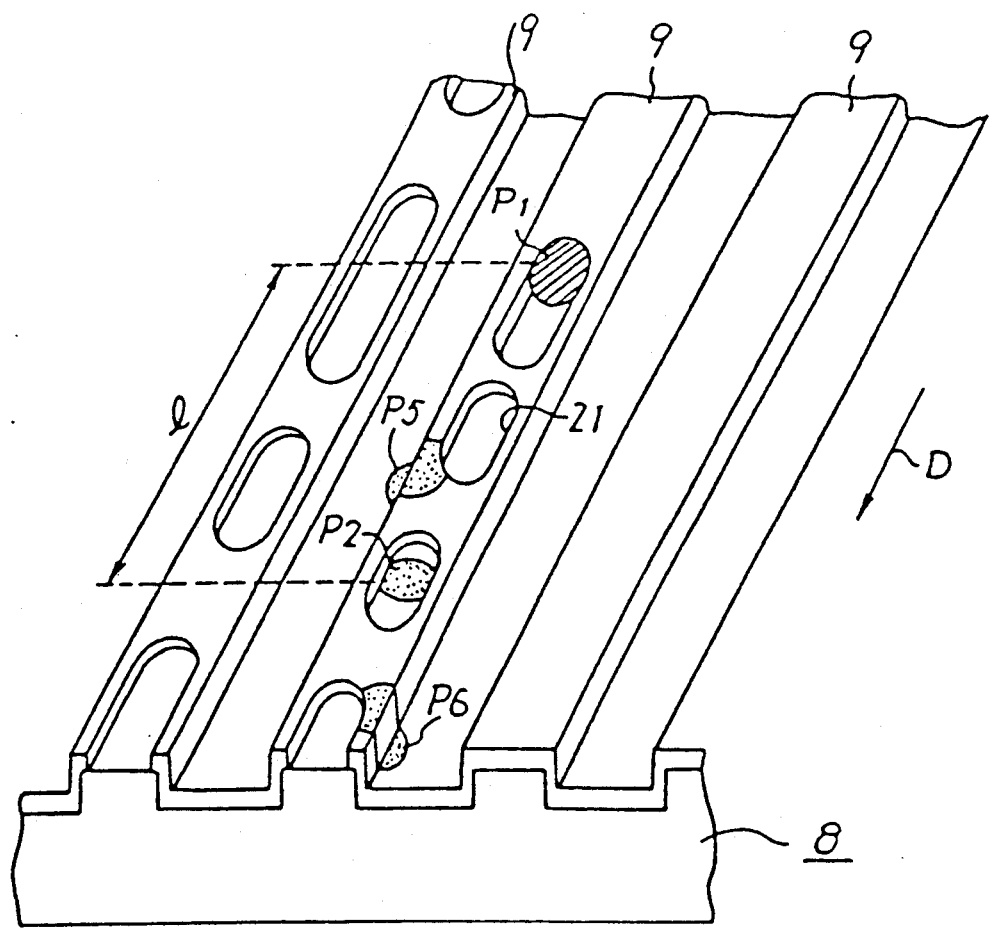
FIG. 2 is a perspective illustration of the irradiation state of the light beams with respect to an information recording medium in FIG. 1.

FIG. 2 is perspective illustration of the irradiation states of light beams L1 and L2 with respect to the information track 9 in FIG. 1, in which reference numerals P1, P2, P5, P6 and 21 are the same as the aforesaid ones.

Next, explanation will be given on operation of an embodiment of the optical information recording/reproducing apparatus of the invention.

For the usual information recording/reproducing operation, the recording beam L1 of wavelength $\lambda_1$ emitted from the light source 1A passes the collimator lens 2A, polarizing beam splitter 4A, ¼ wavelength plate 6A and dichroic beam splitter 28 and is reflected by the tracking mirror 29. It is then focused on the information track 9 at the information recording medium 8 through the objective lens 7 so as to form the recording spot P1, which, in turn, forms the pit 21 to record the information and is simultaneously reflected from the information recording medium 8, thereby constituting a recording reflected beam L1'.

The recording reflected beam L1' again passes the objective lens 7, tracking mirror 29, and dichroic beam splitter 28, and then is reflected by the polarizing beam splitter 4A. It subsequently is received by the photodetector 31 through the wavelength filter 30 and is used as a real-time monitor of recording condition.

The reproducing beam L2 of wavelength $\lambda_2$ emitted from the light source 1B passes the collimator lens 2B and passes the diffraction grating 24 as reproducing beam L2P including the side beams. The reproducing beam L2P passes the polarizing beam splitter 4B and ¼ wavelength plate 6B, and is reflected by the reflector 27, to the dichroic beam splitter 28 where it is again reflected. The beam is then composed with the recording beam L1. Thereafter, the reproducing beam 2P is condensed through the optical system as the same as the recording beam L1 on the information track 9 after recorded, thereby forming the reproducing spot P2 and side spots P5 and P6.

The reproducing reflected beam L2P' from the light spots P2, P5 and P6 again passes the above-mentioned optical system so as to be reflected by the polarizing splitter 4B, and it passes the wavelength filter 32 and convex lens 33 so as to be divided into the reproducing reflected beam L2' and side reflected beams L5' and L6'. The beams are then received by the light receiving surfaces 46 through 48 of the four-divided photodetector 34, at which time a signal representing the total quantity of light of reproducing reflected beam L2' from the light receiving surface 48 serves as the reproducing signal for the recorded information. These signals are used to check simultaneously whether or not the recording spot P1 properly records the information during the recording thereof.

Meanwhile, the light receiving surfaces 46 and 47 receive the side reflected beams L5' and L6' from the side spots P5 and P6, and the differential amplifier 41 fetches a difference between the signals from the light receiving surfaces 46 and 47 and adopts the twin-spot method so as to output the tracking error signal St(R), thereby performing the tracking control with respect to the reproducing beam L2(L2P) through the tracking mirror 29.

At this time, since the side spots P5 and P6 are formed from the reproducing spot P2 only, the side reflected beams L5' and L6' are easy to detect. Also, since the spots P2, P5 and P6 are formed on the information track after recording the information, no unbalance is created in the quantity of reflected light from the side spots P5 and P6.

In addition, the FIG. 1 embodiment cannot eliminate the tracking offset caused by the deviation of parallelism of the line connecting the recording spot P1 and reproducing spot P2 with the information track 9, whereby it is required to hold the relative positional error between the recording spot P1 and the reproducing spot P2 within an allowable range with mechanical accuracy.

Next, an embodiment of another of the present invention will be described in accordance with FIG. 3.

Figure 3:
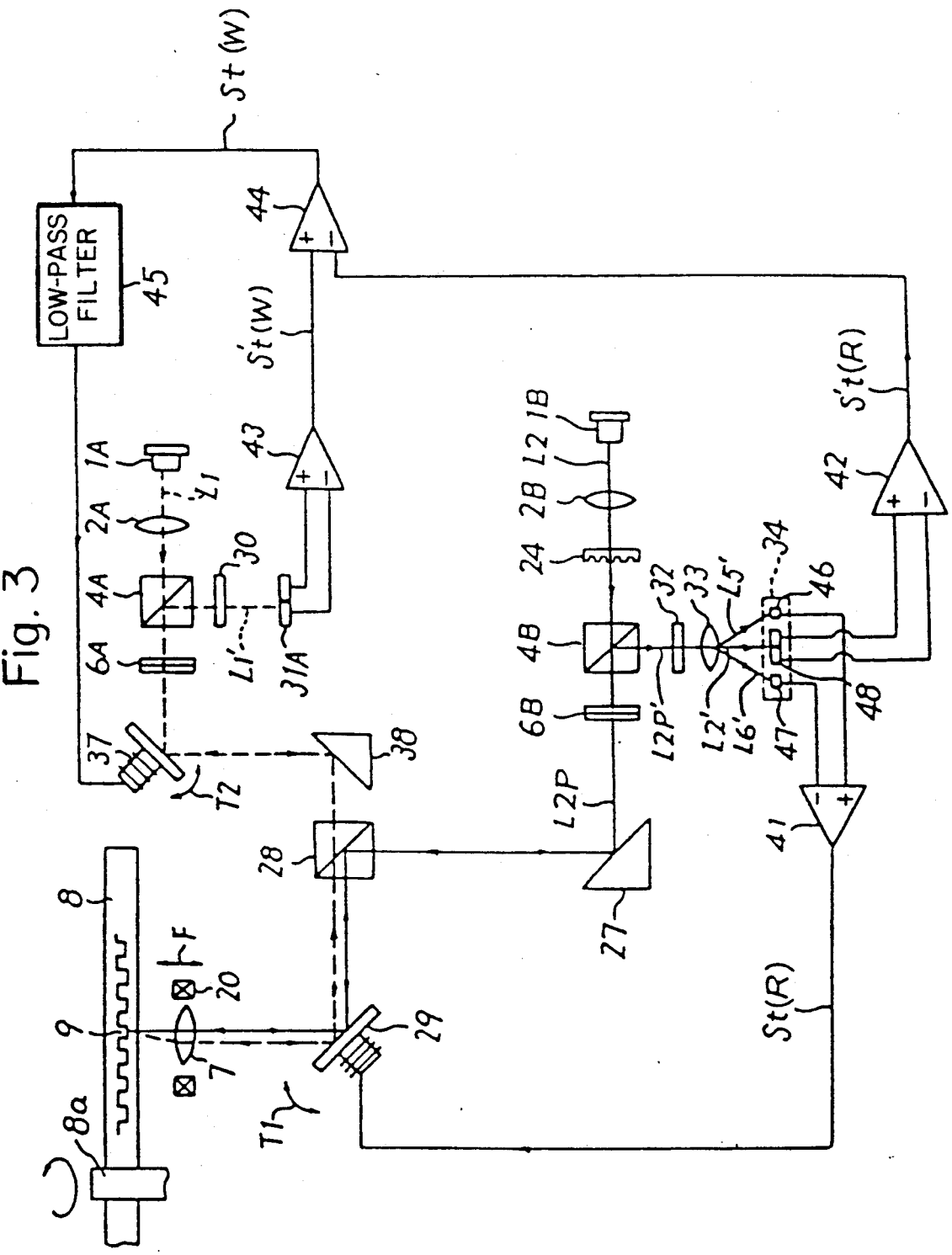
FIG. 3 is a structural view of an embodiment of another of the present invention.

In FIG. 3, reference numerals 24, 27 through 30, 32 through 34, and 41 are the same as the aforesaid ones.

Reference numeral 31A designates a two-divided photodetector corresponding with the photodetector 31. Reference numeral 37 designates a tracking mirror disposed on the optical path of the recording reflected beam L1 passing a ¼ wavelength plate 6A, which rotates in the direction of the arrow T2 corresponding to the traversing direction of the information track 9 so as to act as a tracking-control of the recording beam L1. Reference numeral 38 designates a reflector for projecting the recording beam L1 as reflected by the tracking mirror 37 towards a dichroic beam splitter 28.

Reference numeral 42 designates a second differential amplifier which fetches a difference between the signals from a pair of central light receiving surfaces 48 at a four-divided photodetector 34 so as to output the tracking error signal S't(R) by the push-pull method, 43 designates a third differential amplifier which fetches a difference between the signals from the two-divided photodetector 31A so as to output the tracking error signal S't(W) by the push-pull method, 44 designates a fourth differential amplifier which fetches a difference between the tracking error signals S't(R) and S't(W) so as to output a true tracking error signal St(W) of the recording spot P1, and 45 designates a low-pass filter which allows the D.C. to low-frequency component from the tracking error signal St(W) to pass, thereby driving tracking mirror 37.

The aforesaid wavelength filter 32, convex lens 33, four-divided photodetector 34, and differential amplifier 42, constitute a second tracking error detection system by the push-pull method; the wavelength filter 30, two-divided photodetector 31A and differential amplifier 43, constitute a third tracking error detection system by the push-pull method, the differential amplifier 44 constituting the fourth tracking error detection system; and the differential amplifier 44, low-pass filter 45, and tracking mirror 37, constitute the tracking control system with respect to the recording beam L1.

Figure 4:
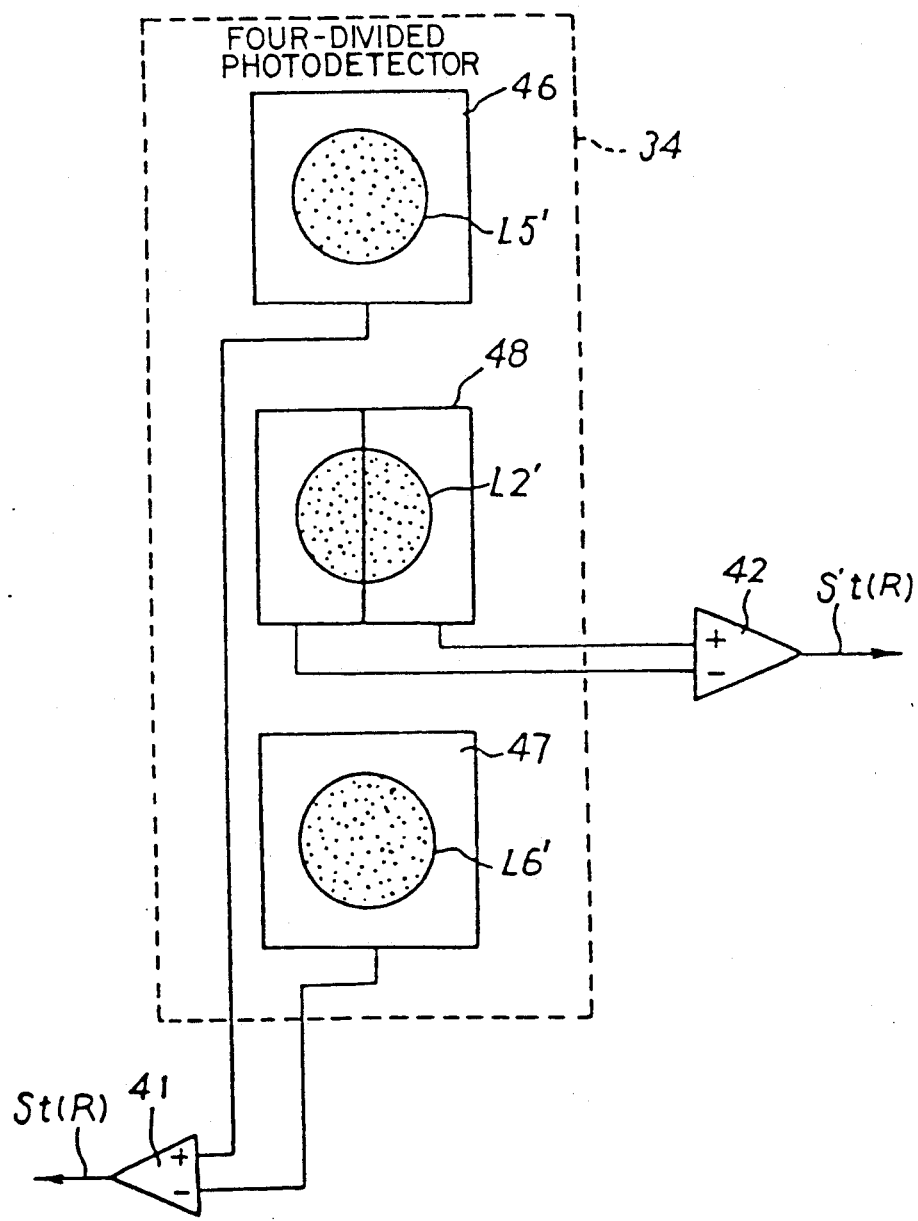
FIG. 4 is a perspective illustration of the light receiving state of a four-divided photodetector in FIG. 3.

FIG. 4 is an illustration showing the side reflected beams L5' and L6' and reproducing reflected beam L2' irradiated onto the light receiving surfaces 46 through 48 at the four-divided photodetector 34.

In addition, the irradiation state of recording beam L1 and reproducing beam L2P with respect to the information track 9 is as shown FIG. 2.

Next, explanation will be given on operation of another embodiment of the present invention with reference to FIGS. 2 through 4.

The basic operation of information recording/reproducing is the same as that in FIG. 1 except that the tracking mirror 37 and reflector 38 are interposed on the optical path of recording beam L1 and recording reflected beam L1'.

Since the tracking control for the reproducing beam L2 is performed by the twin-spot method, the tracking offset is not created by the track follow-up of the objective lens 7 or the inclination of the information recording medium 8. In other words, a differential amplifier 41, as the same as above-mentioned, fetches a difference between the signals from the light receiving surfaces 46 and 47 for receiving the side reflected beams L5' and L6' so as to output the tracking error signal St(R) by the twin-spot method, thereby driving and controlling a tracking mirror 29.

Figure 12:
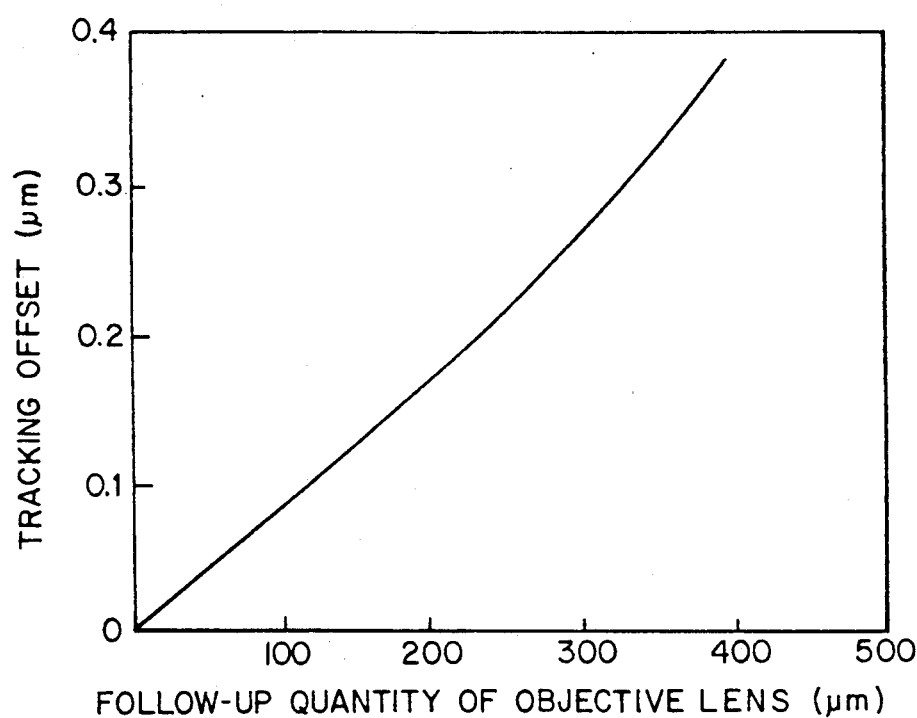
FIG. 12 is a characteristic graph showing the relation between the track follow-up quantity and the tracking offset.
Figure 13:
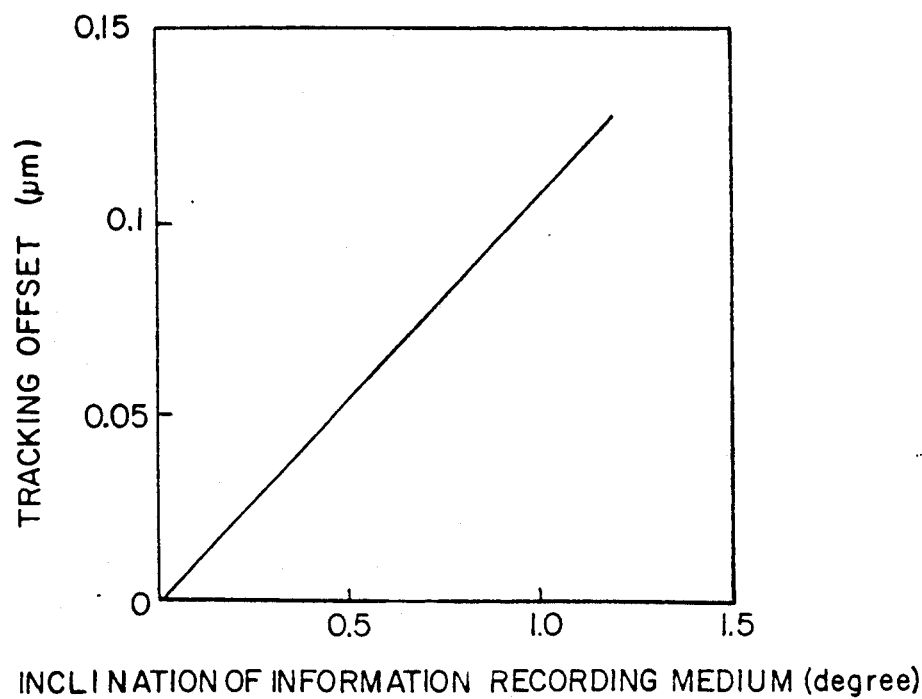
FIG. 13 is a characteristic graph showing the relation between the inclination of information recording medium and the tracking offset.

Also, the tracking control for the recording beam L1 is performed as follows:

At first, the differential amplifier 43 fetches a difference between the signals from the two-divided photodetector 31A and outputs a tracking error signal S't(W) regarding the recording beam L1 by the push-pull method. The tracking error signal S't(W), as shown in FIGS. 12 and 13, includes the tracking offset component caused by the track follow-up of objective lens 7 or the inclination of the information recording medium 8. In other words, when the tracking error component of the recording spot P1 is represented by Δt(W) and the tracking offset component caused by the track follow-up or the inclination of the information recording medium 8 is represented by δ, the tracking error signal S't(W) is given in the following equation:

$$S't(W) = \Delta t(W) + \delta \qquad 1$$

Meanwhile, the differential amplifier 42 fetches a difference between the signals from the light receiving surfaces 48 for receiving the reproducing reflected beam L2' so as to output the tracking error signal S't(R) of the reproducing beam L2 by the push-pull method, the tracking error signal S't(R) also including the tracking offset component the same as the above-mentioned. The reproducing spot P2, however, is properly controlled on the information track 9 due to the tracking control by the twin-spot method, the tracking error signal S't(R) includes only the tracking offset component δ caused by the inclination of the information recording medium 8 and so on. The tracking error signal S't(R) is given in the following equation:

$$S't(R) = \delta \qquad 2$$

Next, the tracking error signals S't(W) and S't(R) are applied to the differential amplifier 44, the tracking error signal S't(R) output from the differential amplifier 42 being applied to the negative input terminal (−) at the differential amplifier 44 and serving as the reference for the tracking error signal St(W) with respect to the recording beam L1. In this case, assuming that the tracking error signals S't(W) and S't(R) are equal in sensitivity to each other with respect to the track follow-up or the inclination of the information recording medium 8, the tracking error signal St(W) output from the differential amplifier 44 is given in the following equation:

$$\begin{aligned} St(W) &= S't(W) - S't(R) \\ &= \Delta t(W) \end{aligned} \qquad 3$$

Accordingly, the tracking error signal St(W) dependent only on the true tracking error quantity Δt(W) of the recording spot P1 is obtained.

The tracking error signal St(W) is supplied to the tracking mirror 37 through the low-pass filter 45 so as to rotatable-drivingly control, in the direction of the arrow T2, the tracking mirror 37 as the tracking actuator for the recording beam L1.

Generally, the relative positional deviations of the recording spot P1 and reproducing spot P2 are caused by variation in the mechanical system and optical system with the lapse of time, a temperature change, or variation in mechanical dimension of the information recording medium 8, whereby the frequency component of relative positional deviation accompanied by rotation of the information recording medium 8 may be deemed to be nearly like DC. Accordingly, in order to stabilize a servo loop, the low-pass filter 45 limits a band width of a tracking servo loop to a low frequency band.

Since the recording beam L1 and reproducing beam L2P use an objective lens 7 in common, the recording spot P1 is also controlled by a tracking servo at the reproducing spot P2 through the tracking mirror 29. Accordingly, for the recording beam L1, the recording spot P1 need only be controlled so as to control the relative positional deviation perpendicular to the information track 9 with respect to the reproducing spot P2 by use of the tracking error signal St(W) according to the equation 3.

In another embodiment of the present invention, the tracking error signals St(W) and St(R) are obtained which depend only on the tracking error with respect to the recording beam L1 and reproducing beam L2P and are scarcely affected by the inclination of the information recording medium 8 or the track follow-up, thereby enabling the tracking offset generated by the inclination of the information recording medium 8 and the track follow-up to be remarkably reduced.

Since the recording beam L1 is always applied with the tracking servo with respect to the reproducing beam L2, there is no fear that one light spot P1 or P2 creates a tracking error by difference in the mechanical dimension between the information recording mediums 8, whereby the tracking offset generated by the eccentricity thereof can remarkably be reduced.

In addition, in the aforementioned embodiments, the tracking error signals S't(W) and S't(R) are described to be equal in sensitivity to each other with respect to the tracking error or the inclination of the information recording medium 8, but the sensitivity actually fluctuates in proportion to received quantities of light at of the photodetectors 31A and 34. In order that such fluctuation is suppressed and in order that the sensitivity with respect to the tracking error or the inclination of the information recording medium 8 does not depend on the light receiving quantity of each photodetector 31a or 34, an automatic gain control unit, as shown in FIG. 5, must be inserted in the tracking servo loop.

Figure 5:
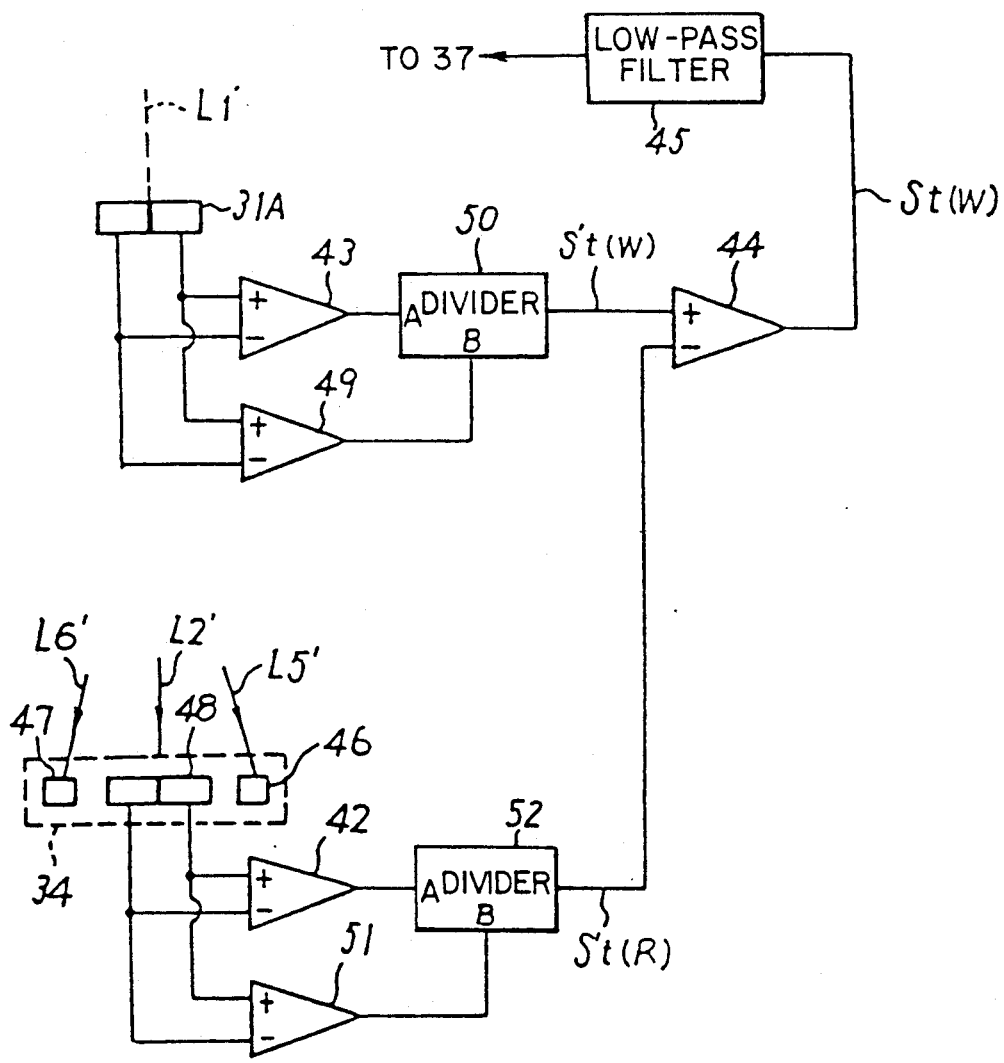
FIG. 5 is a partially structural view of automatic gain control device inserted into an error detection system in the FIG. 3 embodiment.

In FIG. 5, reference numeral 49 designates an adder which fetches the sum of signals from the two-divided photodetector 31A. Reference numeral 50 designates a divider which divides the output signal of differential amplifier 43 applied to an input terminal A from an output signal of the adder 49 which is applied to an input terminal B. The divider 50 outputs the quotient as the tracking error signal S't(W). Reference numeral 51 designates an adder which fetches the sum of signals from the light receiving surfaces 48 at the four-divided photodetector 34, and reference numeral 52 designates a divider which divides (by the output signal of the adder 51 applied to an input terminal B at the divider 52) the output signal of differential amplifier 42 applied to an input terminal A and which outputs the quotient as the tracking error signal S't(R).

The automatic gain control unit comprising the adders 49 and 51 and dividers 50 and 52 is thus inserted, thereby enabling the tracking signals S't(W) and S't(R) which are not-dependent on the light receiving quantity to be obtained.

Figure 6:
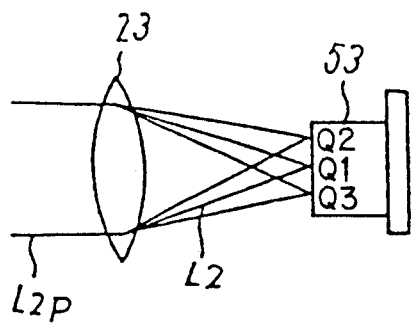
FIG. 6 is a partially structural view of a reproducing light source in the FIGS. 1 and 3 embodiments, which is constituted of a semiconductor laser array.

The embodiments in FIGS. 1 and 3 use the diffraction grating 24 as the side spot generating means for generating the side spots P5 and P6 for tracking, but, as shown in FIG. 6, a semiconductor laser array 53 having three light emitting points Q1, Q2, and Q3 may be used instead of the light source 1B. In this case, the light emitting point Q1 emits the reproducing beam L2 and the points Q2 and Q3 emit the light beams for the side spots P5 and P6 so as to directly obtain a reproducing beam L2P including the three light beams, thereby not requiring the diffraction grating 24.

Figure 7:
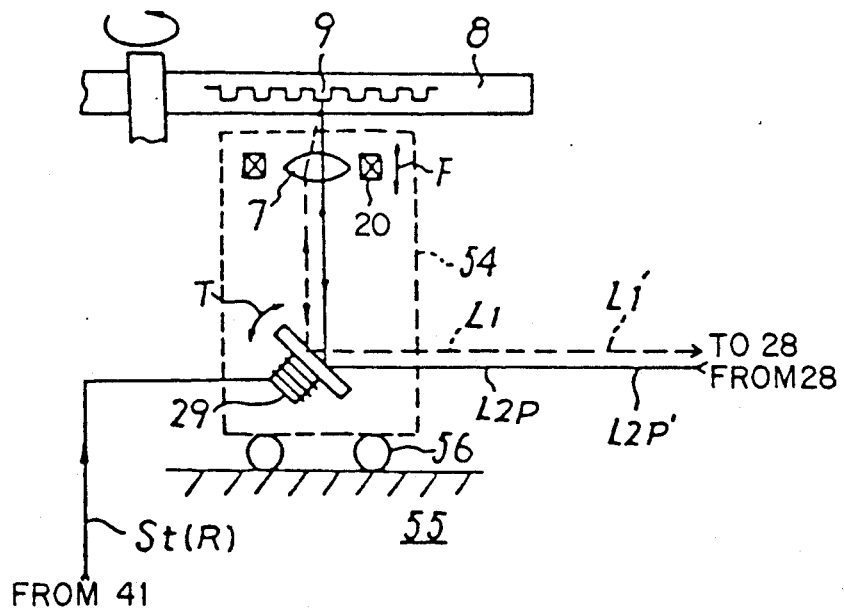
FIG. 7 is a partially structural view of part of the optical system in the FIGS. 1 and 3 embodiments, in which a lens actuator unit is only movable and other parts are fixed to the base member.

Also, in the embodiments shown in FIGS. 1 and 3, for deviation of the optical axes between the respective irradiation light and reflected light with respect to the information recording medium 8 caused by the inclination thereof and track follow-up, the generation of tracking offsets of light spots P1 and P2 is fully reduced. Hence, as shown in FIG. 7, the objective lens 7, focusing actuator 20 and tracking mirror 29 may be separated from the body of optical system so as to be a movable unit 54 of integral construction which is movable through rotary shafts 56 with respect to a base member 55. Hence, since the movable unit 54 may be decreased in weight, the light spots P1 and P2 are movable at high speed in the track traversing direction, thereby reducing the access time in comparison with driving the entire optical system.

Also, the embodiment in FIG. 3 is of two-beam construction with the recording beam L1 of wavelength $\lambda_1$ and the reproducing beam L2 of wavelength $\lambda_2$ nevertheless, multi-beam construction of three beams or more may be used.

Figure 8:
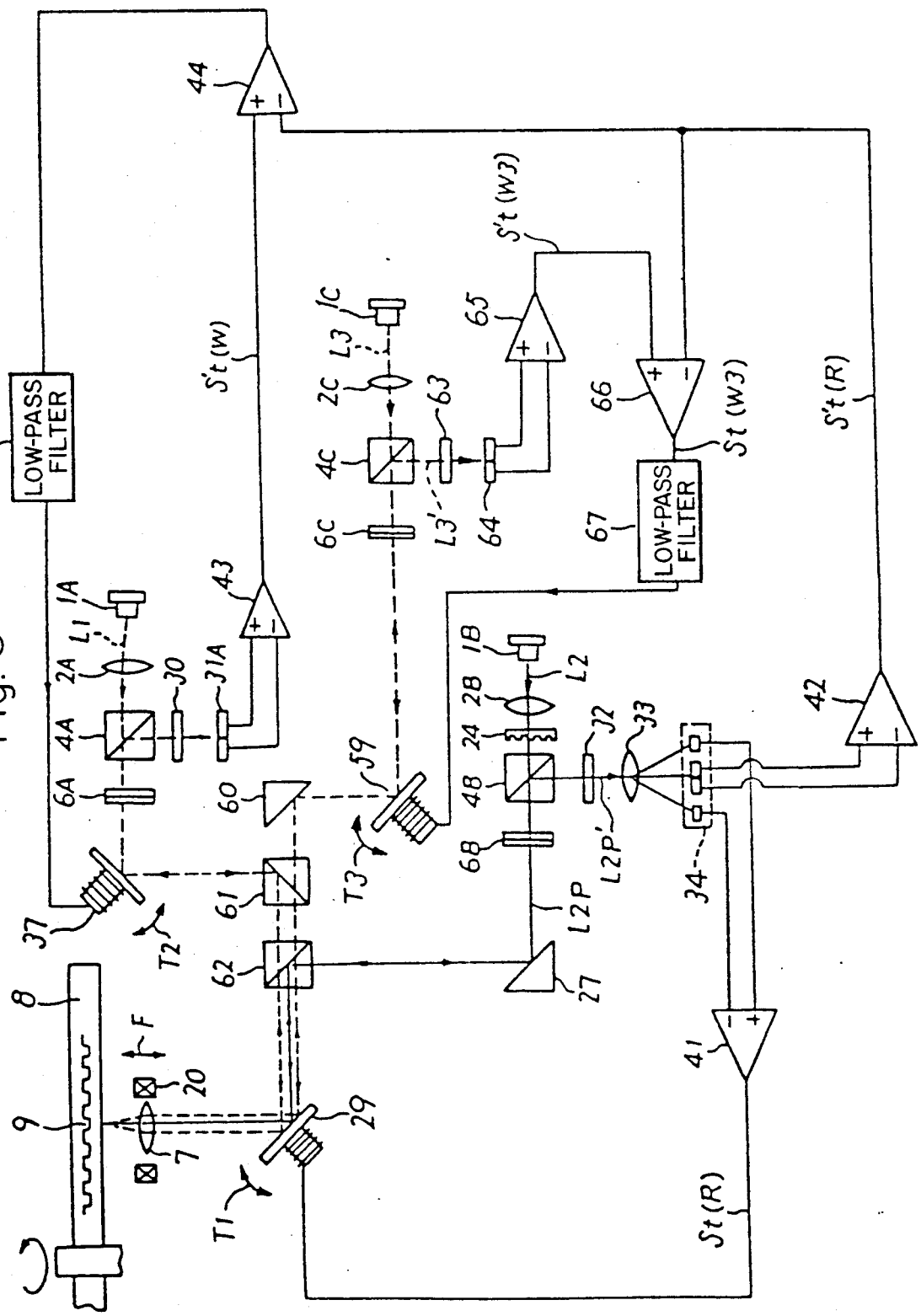
FIG. 8 is a structural view of a modified embodiment of the invention, in which recording light sources are composed of plural laser diodes.

FIG. 8 is a structural view exemplary of embodiment employing multibeam two recording beams, in which reference numeral 1C designates a light source such as a semiconductor laser or the like for emitting a recording beam L3 of wavelength $\lambda_3$. Reference numerals 2C, 4C and 6C designate a collimator lens, a polarizing beam splitter and a ¼ wavelength plate, sequentially disposed on the optical path of the recording beam L3 respectively. Reference numeral 59 designates a tracking mirror rotatable in the direction of the arrow T3 to tracking-control the recording beam L3, and 60 designates a reflector for changing the optical path of recording beam L3 through the tracking mirror 59.

Reference numeral 61 designates a dichroic beam splitter which is disposed on the optical paths of recording beams L1 and L3 and adapted to transmit the recording beam L3 of wavelength $\lambda_3$ and to reflect the recording beam L1 of wavelength $\lambda_1$. Reference numeral 62 designates a dichroic beam splitter for composing the recording beams L1 and L3 and reproducing beam L2 and adapted to transmit the recording beams L1 and L3 of wavelengths $\lambda_1$ and $\lambda_3$ and to reflect the reproducing beam L2P of wavelength $\lambda_2$.

Reference numeral 63 designates a wavelength filter disposed at the reflecting side of the polarizing beam splitter 4C which is adapted to selectively transmit only a recording reflected beam L3' of wavelength of $\lambda_3$. Reference numeral 64 designates a two-divided photodetector for detecting the tracking error signal with respect to the recording beam L3, 65 designates a differential amplifier for fetching a difference between the signals from the two-divided photodetector 64, 66 designates a differential amplifier for fetching a difference between the tracking error signals S't(W3) and S't(R) from the differential amplifiers 42 and 65, and 67 designates a low-pass filter which allows the D.C. to low frequency component to pass therethrough from the tracking error signal St(W3) gained by the differential amplifier 66, thereby driving the tracking mirror 59.

In this case, the wavelength filter 63, two-divided photodetector 64 and differential amplifier 65, constitute a tracking error detection system, and the differential amplifier 66 and low-pass filter 67 constitute a tracking control system. Also, the differential amplifiers 65 and 66 correspond to the differential amplifiers 43 and 44 respectively. Low-pass filter 67 corresponds to the low-pass filter 45, and the tracking mirror 59 being drivingly controlled in the same fashion as the tracking mirror 37.

Also, in the embodiment shown in FIGS. 1 and 3, the light beams L1 and L2P from the recording optical system and reproducing optical system are composed with each other by use of one dichroic beam splitter 28 and the polarizing beam splitters 4A and 4B provided at the optical systems respectively. These beam splitters 4A and 4B the irradiation light comprising the recording beam L1 and reproducing beam L2P from the reflected light comprising the recording reflected beam L1' and reproducing reflected beam L2P'. Alternatively, as shown in FIG. 9, one polarizing beam splitter for separating the reflected light may be disposed on the optical path of the composite light beams L1 and L2P emitted from the light sources 1A and 1B.

Figure 9:
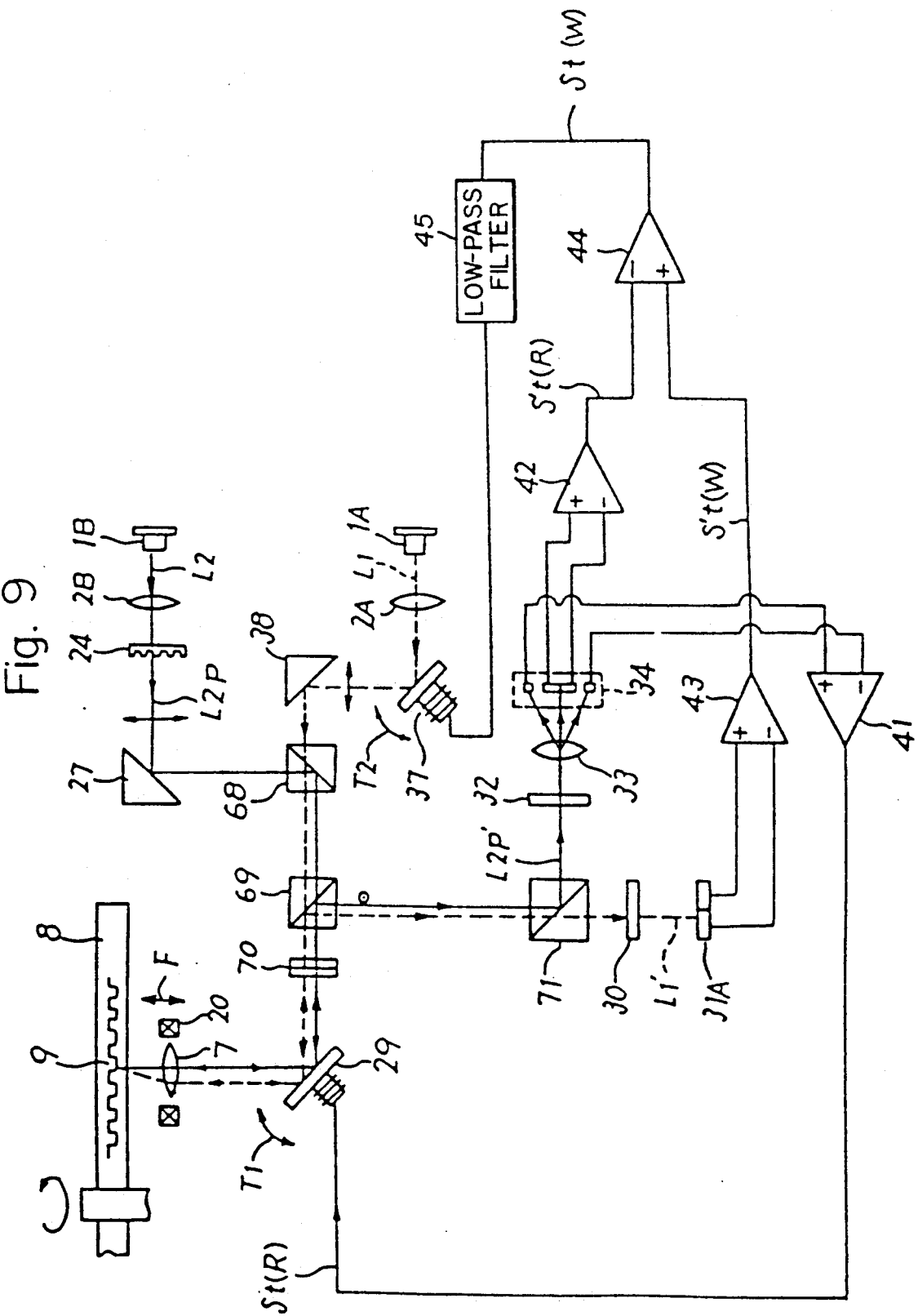
FIG. 9 is a structural view of an optical system different in the FIGS. 1 and 3 embodiments.

Referring to FIG. 9, reference numeral 68 designates a dichroic beam splitter for composing the recording beam L1 and reproducing beam L2P and adapted to transmit the recording beam L1 of wavelength $\lambda_1$ and reflect the reproducing beam L2P of wavelength $\lambda_2$. Reference numeral 69 designates a polarizing beam splitter for separating the irradiation light from the reflected light with respect to the information recording medium 8 and adapted to transmit the irradiation light and reflect the reflected light. The beam splitter 69 together with the composing dichroic beam splitter 68 constitute the beam composing means. Reference numeral 70 designates a ¼ wavelength plate disposed on the optical path between the polarizing beam splitter 69 and the tracking mirror 29. Reference numeral 71 designates a dichroic beam splitter for beam-separating disposed on the optical path at the reflection side of polarizing beam splitter 69, which transmits the recording reflected beam L1' of wavelength $\lambda_1$ and reflects the reproducing reflected beam L2P' of wavelength $\lambda_2$, thereby separating the reflected beams L1' and L2P' from each other toward the tracking error detection system.

In this case, in order to use a common polarizing beam splitter 69, the polarizing directions of irradiation lights L1 and L2P are disposed in parallel to the drawing plane, as shown by an arrow on the optical path. The polarizing directions of the reflected lights L1' and L2P' is perpendicular to the drawing plane.

Since the common section of the optical path is longer in FIG. 9, variation in each light beam is reduced, thereby enabling the tracking control stable and of high reliability.

Furthermore, in the embodiment of FIGS. 1 and 3, the tracking mirror 29 is used for tracking control. Alternatively, a two-dimensional actuator capable of being driven perpendicularly to the information track 9 may be used instead of the focusing actuator 20, and the tracking mirror 29 may be omitted.

POSSIBILITY OF INDUSTRIAL UTILIZATION

As seen from the above, the present invention is applicable not only to the optical information recording-/reproducing apparatus using an optical disc but also to an optical information recording/reproducing apparatus using a photocard or other optical recording media.

What is claimed is:

1. An optical information recording and reproducing apparatus comprising:
    a light source for generating a recording beam;
    a light source for generating a reproducing beam;
    a lens for focusing the recording beam and the reproducing beam onto an optical recording medium to produce a recording light spot and a reproducing light spot, respectively, on said recording medium;
    means for forming an additional pair of light spots from said reproducing beam wherein the additional pair of spots are positioned adjacent to said reproducing light spot;
    means for composing said recording beam and reproducing beam so as to be irradiated onto said information recording medium; and
    a tracking error detection system for obtaining a tracking error signal by a twin-spot method, said error signal indicating a difference between light signals reflecting off said optical recording medium from said additional pair of light spots; and
    a tracking controller responsive to said tracking error signal for adjusting where the reproducing beam strikes the optical recording medium.

2. An optical information recording and reproducing apparatus as set forth in claim 1, wherein said means for forming an additional pair of light spots is a diffraction grating.

3. An optical information recording and reproducing apparatus as set forth in claim 1, wherein said light source for generating the reproducing beam and said means for forming an additional pair of light spots comprises a semiconductor laser array having a plurality of light emitting points.

4. An optical information recording and reproducing apparatus as set forth in claim 1 wherein said recording beam and said reproducing beam have different wavelengths and said means for composing the recording beam and the reproducing beam is a dichroic beam splitter which transmits one of said recording beam and reproducing beam and reflects the other.

5. An optical information recording and reproducing apparatus as set forth in claim 1 wherein said recording beam and said reproducing beam have different wavelengths and have the same polarization direction, and said means for composing the recording beam and the reproducing beam comprises a dichroic beam splitter for composing said recording beam and reproducing beam and a polarizing beam splitter for separating beams striking the optical recording medium from the light signals reflecting off the optical recording medium.

6. An optical information recording and reproducing apparatus as set forth in claim 1 wherein said tracking error detection system includes a four divided photodetector having a pair of light receiving surfaces, each for receiving one of said light signals reflecting off the optical recording medium from the additional pair of light spots and a differential amplifier for amplifying a difference between signals received at said light receiving surfaces and for outputting said difference as said tracking error signal.

7. An optical information recording and reproducing apparatus as set forth in claim 1 wherein said lens along with a tracking mirror and a focusing actuator are formed as a movable unit of integral construction.

8. An optical information recording and reproducing apparatus comprising:
    a light source for generating a recording beam;

a light source for generating a reproducing beam;

a lens for focusing the recording beam and the reproducing beam onto an optical recording medium to produce a recording light spot and a reproducing light spot, respectively, on said recording medium;

means for forming an additional pair of light spots said reproducing light spot which are positioned adjacent to said light reproducing spot;

means for composing said recording beam and reproducing beam so as to be irradiated onto said information recording medium;

a first tracking error detection system for obtaining a tracking error signal St(R) by a twin-spot method, said St(R) signal indicating an intensity difference between light beams reflecting off said optical recording medium from said additional pair of light spots;

a second tracking error detection system for obtaining a tracking error signal St'(R) by a push-pull method, being obtained by a reflected beam from said reproducing light spot;

a third tracking error detection system for obtaining a tracking error signal St'(W) by a push-pull method, said St'(W) signal being obtained by a reflecting beam from said recording light spot; and a fourth tracking error detection system for obtaining a tracking error signal St(W) indicating a difference between said tracking error signal St'(W) and said tracking error signal St'(R);

a tracking controller for controlling positioning of said reproducing light spot on said optical recording medium in response to said tracking error signal St(R) and for controlling positioning of said recording light spot or said optical recording medium in response to said tracking error signal St(W).

9. An optical information recording and reproducing apparatus as set forth in claim 8, wherein said means for forming an additional pair of light spots is a diffraction grating.

10. An optical information recording and reproducing apparatus as set forth in claim 8, wherein said light source for generating said reproducing beam and said means for forming an additional pair of light spots comprises a semiconductor laser array having a plurality of light emitting points.

11. An optical information recording and reproducing apparatus as set forth in claim 8 wherein said recording beam and said reproducing beam have different wavelengths and said means for composing the recording beam and the reproducing beam is a dichroic beam splitter which transmits one of said recording beam and reproducing beam and reflects the other.

12. An optical information recording and reproducing apparatus as set forth in claim 8 wherein side recording beam and said reproducing beam have different wavelengths and have the same polarization directions, and said means for composing the recording beam and the reproducing beam comprises a dichroic beam splitter which transmits one of said recording beam and reproducing beam and reflects the other, and a polarizing beam splitter for separating beams striking the optical recording medium from the light signals reflecting off the optical recording medium.

13. An optical information recording and reproducing apparatus as set forth in claim 8 wherein;

said first tracking error detection system includes a four-divided photodetector having light receiving surfaces at both ends for receiving said light beams reflected from the additional pair of light spots and a pair of central light receiving surfaces for receiving light beams reflected from the light reproducing spot and a first differential amplifier which amplifies a difference between the signals from said light receiving surfaces at both ends and which outputs said difference as said tracking error signal St(R);

said second tracking error detection system including a second differential amplifier which amplifies a difference between the signals from said pair of central light receiving surfaces and outputs said difference as said tracking error signal S't(R);

said third tracking error detection system including a two-divided photodetector for receiving light beams reflected from said recording spot and a third differential amplifier which amplifies a difference between the signals from said two-divided photodetector and which outputs said difference as said tracking error signal S't(W); and said fourth tracking error detection system including a fourth differential amplifier which amplifies a difference between said tracking error signals S't(R) and S't(W) and outputs said difference as said tracking error signal St(W).

14. An optical information recording and reproducing apparatus as set forth in claim 8 wherein said lens along with a tracking actuator and a focusing actuator are formed in a movable unit of integral construction.

15. An optical information recording and reproducing apparatus as set forth in claim 8 wherein:

said first tracking error detection systems includes a four-divided photodetector having a light receiving surface at both ends for receiving said light beams reflected from the additional pair of light spots and a pair of control light receiving surfaces for receiving light beam reflected from the reproducing light spot, and a first differential a.nplifier which amplifies a difference between the signals from said light receiving surfaces at both ends and which outputs said difference as said tracking error signal St(R);

said second tracking error detection system including a second differential amplifier which takes one output signal of said pair of central light receiving surfaces from the other output signal and outputs a difference between the above signals, a first adder which outputs the sum of the above signals from said pair of central light receiving output, and a first divider which divides the output signal of said second differential amplifier by the output signal of said first adder and outputs a quotient as said tracking error signal S't(R);

said third tracking error detection system including a two-divided photodetector for receiving light beams reflected from said recording spot, a third differential amplifier which takes one output signal of said two-divided photodetector from the other output signal, and outputs a difference between the above signals, a second adder which outputs the sum of the above signals from said two-divided photodetector, and a second divider which divides the output signal of said third differential amplifier by the output signal of said second adder and outputs a quotient as said tracking error signal St(W);

said fourth tracking error detection system includes a fourth differential amplifier which amplifies a difference between said tracking error signals S't(W) and S't(R) and outputs said difference as said tracking error signal St(W).

* * * * *